United States Patent [19]

Toalson

[11] 4,321,836

[45] Mar. 30, 1982

[54] TON-MILE RECORDER

[76] Inventor: David C. Toalson, 861 White Oak Dr., Bellville, Tex. 77418

[21] Appl. No.: 163,586

[22] Filed: Jun. 27, 1980

Related U.S. Application Data

[63] Continuation-in-part of Ser. No. 51,515, Jun. 25, 1979, abandoned.

[51] Int. Cl.³ .............................................. G01L 3/00
[52] U.S. Cl. .............................. 73/862.44; 73/862.56
[58] Field of Search ........... 73/432 R, 862.44, 862.56, 73/151, 158; 364/560, 561; 235/103, 92 MP, 92 DN; 200/61.5, 61.7

[56] References Cited

U.S. PATENT DOCUMENTS

| | | | |
|---|---|---|---|
| 3,298,226 | 1/1967 | Hildebrandt | 73/862.56 |
| 3,774,445 | 11/1973 | Rundell et al. | 73/151 |
| 3,884,071 | 5/1975 | Howeth | 73/151 |
| 3,953,713 | 4/1976 | Deligt | 364/560 |

Primary Examiner—S. Clement Swisher
Attorney, Agent, or Firm—Gunn, Lee & Jackson

[57] ABSTRACT

An improved ton-mile recorder for accurately measuring the work done by a cable of a drawworks system. Analog signals representing weight applied to the cable and pulse signals representative of cable movement are integrated electronically to provide electrical gate pulse signals that represent work done by the cable. A high degree of accuracy of the resulting work indicating pulse signals is accomplished by synchronizing a gate pulse of predetermined duration with a pulse train, the frequency of which is representative of weight applied to the cable. A proximity detector is employed to detect the various evenly spaced bolts of a bolt circle of the typical drawworks clutch which rotates along with the cable drum. As each bolt passes the proximity detector, a pulse signal is transmitted which indicates a segment of drum movement and thus a segment of cable movement.

15 Claims, 6 Drawing Figures

TON-MILE RECORDER

FIELD OF THE INVENTION

This is a continuation-in-part of U.S. Patent Application Ser. No. 051,515, filed June 25, 1979 and entitled IMPROVED TON-MILE RECORDER now abandoned.

This invention relates generally to ton-mile recorder devices that are provided to determine accumulation of work done by the cable of a drawworks, such as the drawworks of an oil well drilling rig, for example. More particularly, the present invention is directed to electronic circuitry capable of obtaining electrical input relating to small segment incremental movement of the cable and the weight that is supported by the cable and integrating these electrical signals in such manner that an accumulated display is provided that accurately indicates the total amount of work done by the cable.

BACKGROUND OF THE INVENTION

Although the present invention is discussed herein particularly as it applies to drawworks systems of oil well drilling rigs and the like, it is not intended by such discussion to limit the scope of the invention in any manner whatever. It is obvious that the present invention is applicable to other cable lifting mechanisms within the spirit and scope of the present invention.

Standard steel cable or "wire rope" is utilized in the majority of drilling rigs, in a block and tackle configuration in order to support the weight of the drill string and any fluid contained within the drill string while the drill string is rotated during drilling. The block and tackle system is operated by a drawworks mechanism for the purpose of raising and lowering the drill string when the drill string is being removed or replaced in the well bore, such as during replacement of worn drill bits or changes to drill bits or other down hole devices of different character. The typical block and tackle assembly of typical well drilling rigs incorporates a crown block that is fixed at the upper portion of the drilling rig and a traveling block that is elevated and lowered by means of cable or wire rope that interconnects the traveling block with the crown block. The traveling block on modern drilling rigs may often have a capability of lifting 500 tons or more, and the traveling block alone may weigh on the order of 15 tons. It is obvious that failure of the wire line or cable supporting the traveling block would have disastrous consequences even though the support hook of the block were empty at the time of line failure. As is typically the case, several workmen attend to duties on the drilling floor and work directly beneath the traveling block during most of their respective duties.

In order to eliminate or greatly reduce the possibility of the drilling support cable breaking in use, after the cable has been subjected to a certain amount of work, it is common practice to cut a predetermined length of cable from the hoisting drum end and feeding a like lengthh from a storage reel into the block and tackle system, thus ensuring that the block and tackle is always supported by fresh, safe cable.

In order to facilitate a full understanding of the present invention, the basic nature of a drilling rig hoisting system should be kept in mind. The crown or fixed block of the drilling rig system typically consists of seven large diameter sheaves, while the traveling block of the block and tackle system consists of six sheaves. Bulk wire line or cable is stored on a reel near the drilling apparatus. The cable from the storage reel is routed through a dead line anchor to the crown block, down to the traveling block, back to the crown block and so on, finally from the crown block to the drawworks hoisting drum of the drawworks system. It is customary to begin drilling operation with eight lines passing between the crown and traveling blocks. This provides an eight-to-one mechanical advantage, meaning that the blocks are capable of lifting a weight equal to eight times the tension in the line (the tension on the lines of a pulley system is constant throughout the system). As the well bore is drilled deeper, and the weights of drill string and casings become greater, it is typical practice to "string up" ten or twelve lines between the crown block and traveling block in order to increase the mechanical advantage at the expense of decreasing the consequent speed of the traveling block as it is raised and lowered.

The tension in the cable or line of the block and tackle system is constant, and wear of the cable is a function of the product of tension (tons) and the distance of cable travel (miles). The cable being spooled onto the drawworks drum (which, if twelve lines are strung, must move twelve times the distance the traveling block moves) is subject to maximal wear. This line is called the fast line. Each successive line between the blocks moves proportionately less distance for a corresponding movement of the block, until at last the line between the crown block and the dead line anchor is static, and subject to no wear. It is generally accepted that line wear is a function of work as long as the fast line linear velocity is maintained below 4,000 feet per minute. Ton-mile measurements are always taken to represent fast line work and wear, but due to the fact that previous distance measuring devices are not capable of accurate distance measurement at the rate of 4,000 feet per minute, devices in previous ton-mile recorders have measured the distance the slow line traveled, then multiplied this distance by the number of lines strung, necessitating the use of a line selector switch or some other implementation in order to provide for appropriate multiplication of the line travel detected.

In the instance of cable for supporting the traveling block of drilling rigs, the accumulated work done by the cable is measured in terms of ton-miles. Ton-miles may be, and have been for many years, accumulated manually by means of calculations taking into account the depth of the well, the weight of the drill string, and the number of times the drill string is inserted and extracted from the well bore. Manual accumulation of ton-miles representing work is unfortunately subject to the vagaries of human nature, as well as the errors in estimating, counting and calculation involved in such manual calculation operations. The accumulated errors force the operator of the drilling rig to cut and slip the drilling cable before it has served out its useful life, thereby increasing rig operating costs and adversely affecting the commercial nature of the well being drilled by the drilling rig. It is therefore desirable to provide a means for accurately and automatically accumulating evidence of the work done by the cable of a drilling rig drawworks and block and tackle system which does not require attention by well drilling personnel other than monitoring the accumulated work indicating device from time to time.

THE PRIOR ART

There have been a number of attempts to record ton-miles by mechanical means, some of which have been more or less successful. For example, U.S. Pat. No. 3,390,574 of Jones discloses a hydraulic-mechanical ton-mile recorder and U.S. Pat. Nos. 3,298,226, 3,382,713 and 3,538,761 disclose similar ton-mileage recorder devices having mechanical and hydraulic features for operation thereof. Electronic ton-mile recorder systems have been developed such as disclosed in U.S. Pat. No. 3,884,071 of Howeth et al which discloses an electronic ton-mile integrator system. Electronic circuitry has also been developed to detect weight on drill bits as shown in U.S. Pat. No. 3,774,445 of Rundell et al. Most of the prior art devices suffer from similar problems of comlexity and expense.

Most ton-mile recording devices require distance sensing elements that are located in the vicinity of the crown block, which requires the maintenance of heavy, cumbersome equipment high above the working floor of the drilling rig. Moreover, crown block movement sensing devices are typically exposed to the hazards of the environment of the well being drilled and may deteriorate seriously or become inaccurate in the event the environment of the well drilling operation is excessively hazardous. Where electrical crown block sensors are employed, it is necessary to install electrical cable from the drilling floor to the vicinity of the crown block structure and thus presents a considerable expense during installation and maintenance of electrical crown block movement detection systems. In accordance with U.S. Pat. No. 3,884,071, modification of the usual crown block assembly is required to install magnets in the slow line sheave, and strain gauges are located under the pillow block supports for the fast line sheave. Tonmileage recorder structures of this nature obviously create problems of difficult and costly installation and maintenance and, since the distance measuring device is placed on the slow line sheave, while the object of the measurement is the fast line, all such devices require manual operation of a "line selector" system in order to convert the measurement from slow line distance to fast line distance. This, of course, opens the results of the measurements to the vagarities of human nature, in that the accuracy of the calculation is subject to human error.

It is therefore a primary feature of the present invention to provide a novel ton-mileage recorder system for drilling rig drawworks and block and tackle systems and the like that requires no components thereof to be mounted in the crown block or high in the derrick structure of the drilling rig.

It is also a feature of this invention to provide a novel ton-mile recorder system that is simple to install and may be effectively integrated into existing drilling rig systems without requiring extensive modification thereof.

It is an even further feature of this invention to provide a novel ton-mile recorder system for drilling rig cable systems and the like which provides accurate ton-mile measurement automatically without human attention to make line selections, etc.

It is another feature of the present invention to provide a novel ton-mile recorder system that is simple to install, maintain and operate as well as being of inexpensive manufacture.

Another important feature of the present invention is the provision of a novel ton-mile recorder system for drilling rigs and the like having the capability of easily responding to high velocity cable speeds, thus rendering the recorder system directly responsive to the fast line end of the cable system.

An even further feature of this invention concerns the provision of a novel ton-mile recorder system that is effective even under circumstances where the measurement of incremental line movement is minimal.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

The instant invention, by virtue of its advanced technology, is capable of responding to line speed up to 4,000 feet per minute, which is a speed in excess of that expected at the maximum speed of cable movement in a drilling rig's drawworks, block and tackle system. Moreover, cable movement is detected at the fast line end of the cable system and is detected directly in response to small incremental rotary movement of the cable drum of the drilling rig drawworks system. This feature obviates the need for any multiplication system such as a line selector switch or some other mechanical system that accomplishes variation of multiplication responsive to the number of lines employed in a block and tackle system. Briefly, the invention is carried out by providing a suitable metal proximity detector that is interconnected with a signal process system and by processing electrical signals that represent increments of movement of the fast line of a drawworks operated block and tackle system. Electrical signals representing cable movement are then integrated with electrical signals representing the weight that is applied to the cable during the increments of movement.

In one form of the invention, use is made of a bolt circle or other surface discontinuity to represent incremental movement of the drawworks drum. The boltheads of the bolts or the other surface discontinuity, which must rotate at all times with the drawworks drum, may be seen to represent incremental and definite distance of wire line motion. This wire line motion is detected and directly converted to electrical signals for electronic processing.

In another form of the invention, a multitooth gear may be connected with the shaft of the drawworks drum and each of the multiple teeth of the gear will represent an increment of rotary movement of the drawworks drum.

In either of the above forms of this invention, a Hall-effect (or other) metal proximity detector is so located relative to the gear teeth or bolt circle that passage of each gear tooth or bolt head is detected, regardless of the direction of drum movement, and an electrical pulse signal is generated and transmitted to a signal processing system. Simultaneously, an electrical analog signal is generated responsive to the weight applied to the cable of the block and tackle system. The weight (tons) analog is taken by means of an electrical strain gauge pressure transducer that is tapped into the hydraulic weight indicating system of the drilling rig. Since hydraulic weight indicators are installed on virtually every modern drilling rig, this results in minimum cost installation. The electrical analog signal is also transmitted to the signal processing system and is integrated with the pulse signal output of the metal proximity detector in order to yield information identifying cumulative work that is done by the cable during use. The cable movement incremental pulse signals are first processed by means of a Schmitt trigger circuit that functions to shape up the incoming pulse and provide a fast rise time that is necessary to operate a monostable multivibrator circuit, and which is also referred to as a one-shot. The Schmidt trigger circuit also includes a resistance and capacitance network that filters any transient phenomenon that may be present in the input thereof. The variable resistor and capacitor of the one-shot circuit is provided for the purpose of adjusting the width of the pulse signal such that positive going pulse segments applied to the input will trigger it to produce an output pulse of a desired duration. The width of the output pulse of the one shot is carefully determined such that at maximum wire line speed, the pulses remain unitary and do not become contiguous.

The weight analog, which is a D.C. voltage, the magnitude of which is proportional to the weight on the traveling block, is, after suitable input filtering to remove transients, applied to a voltage-to-frequency converter, such that a pulse train is produced having a frequency that is proportional to the tension in the drill line, and thus the weight of the traveling block and any load supported thereby. The output of the voltage-to-frequency converter is introduced to the "clock" input of a "D" type flip-flop circuit along with introduction of the adjusted pulse output of the one-shot at the data input of the flip-flop circuit. The "D" type flip-flop circuit synchronizes the gate pulse window with the weight frequency pulses in that the gate pulse is applied to the data or "D" input which arms the flip-flop circuit to transfer the gate pulse to the "Q" output of the flip-flop circuit at the next positive edge of the weight pulse applied to the "clock" input of the flip-flop circuit. Thus, the gate pulse is delayed to correspond exactly with the beginning of the next weight pulse and any false pulses that might otherwise be admitted are eliminated. This feature greatly increases the accuracy achieved by the circuitry.

The "Q" output (the synchronized gate pulse) of the flip-flop circuit and an output of the voltage-to-frequency converter are applied to an AND gate with the output of the AND gate being subjected to division to prepare the signal for operation of a digital counter that registers accumulation of the signals in ton-miles.

BRIEF DESCRIPTION OF THE DRAWINGS

In order that the manner in which the above-recited advantages and features of this invention are attained and can be understood in detail, more particular description of the invention briefly summarized above may be had by reference to the specific embodiment thereof that is illustrated in the appended drawings, which drawings form a part of this specification. It is to be understood, however, that the appended drawings illustrate only a typical embodiment of the invention and are therefore not to be considered limiting of its scope, for the invention may admit to other equally effective embodiments.

IN THE DRAWINGS

Figure 1:
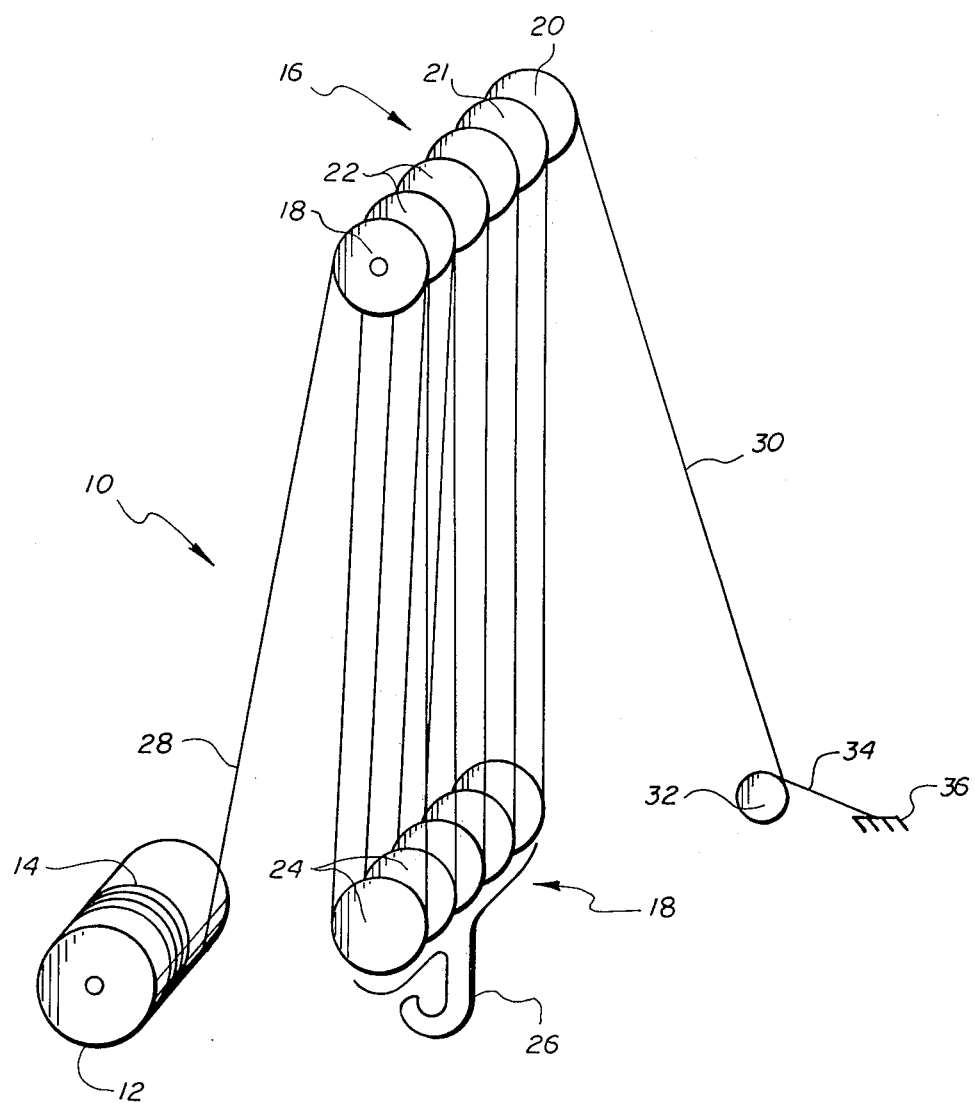

FIG. 1 is a mechanical schematic illustration of a drawworks drum and block and tackle system such as is typically employed by oil well drilling rigs.

Figure 2:
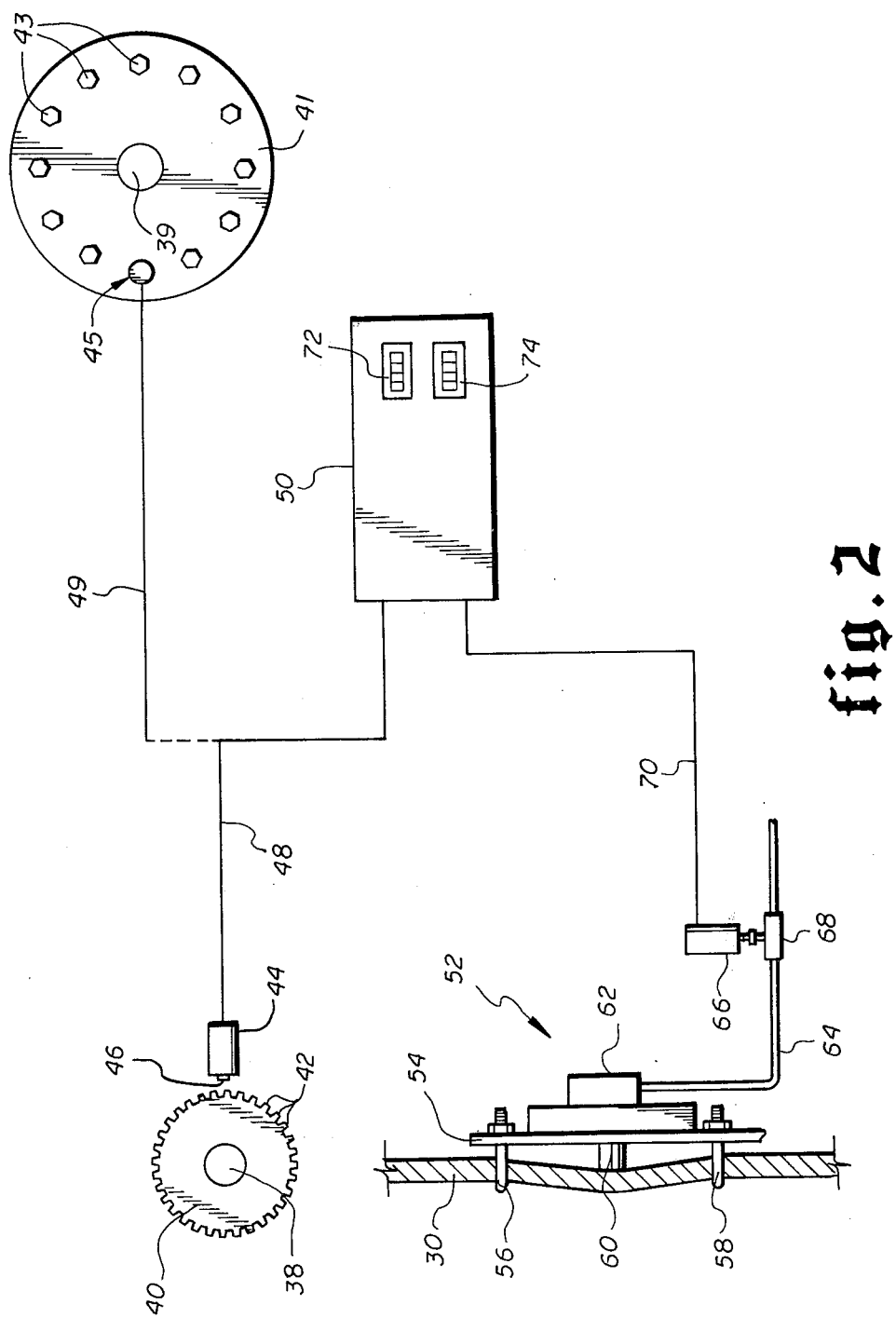

FIG. 2 is a combination mechanical, hydraulic and electrical schematic diagram illustrating developing of pulse and analog signals relating to cable movement and cable weight, together with apparatus for processing the electrical signals to perform such integration thereof as to yield electrical signals representing work done by the cable during use.

Figure 3:
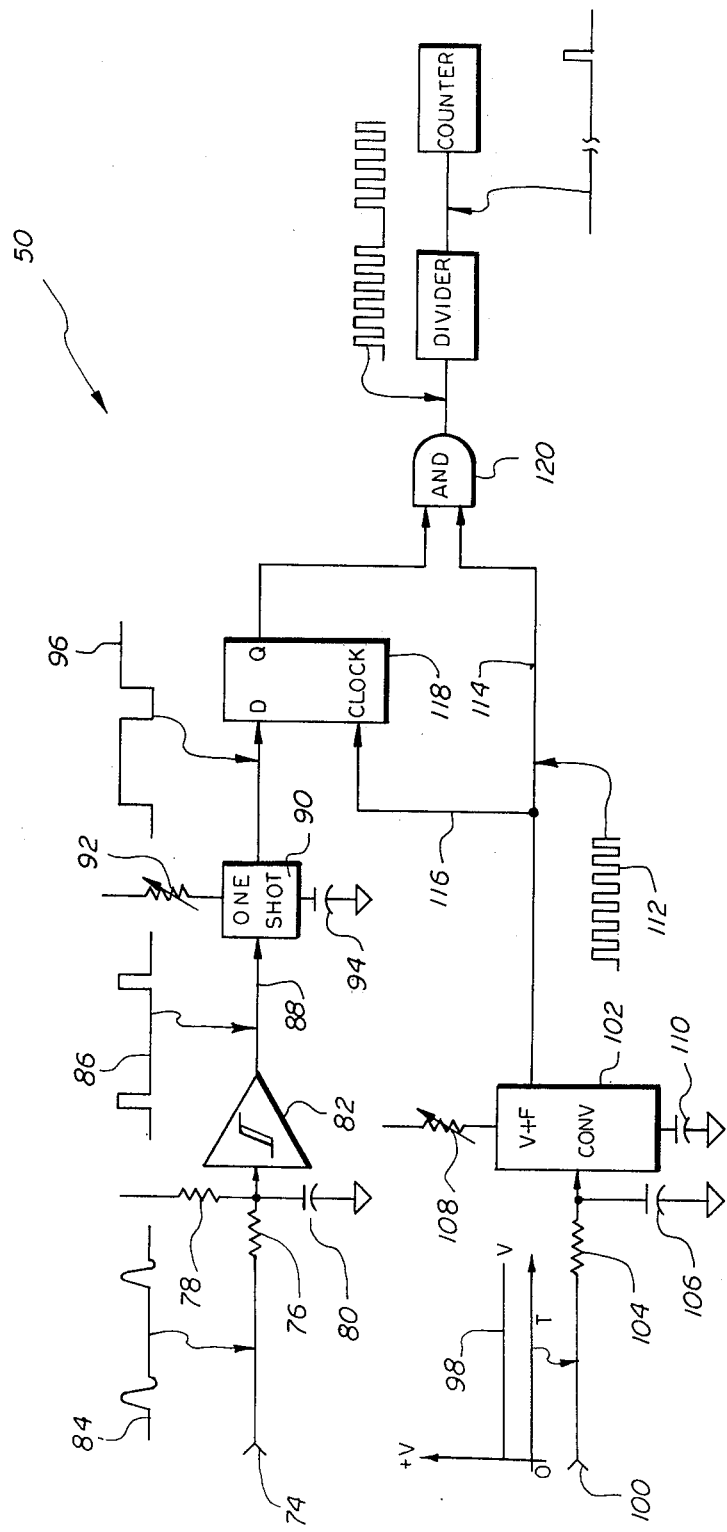

FIG. 3 is an electrical schematic circuit that is capable of receiving the pulse and analog signals and achieving integration thereof to develop the cable work indicating signal.

Figure 4:
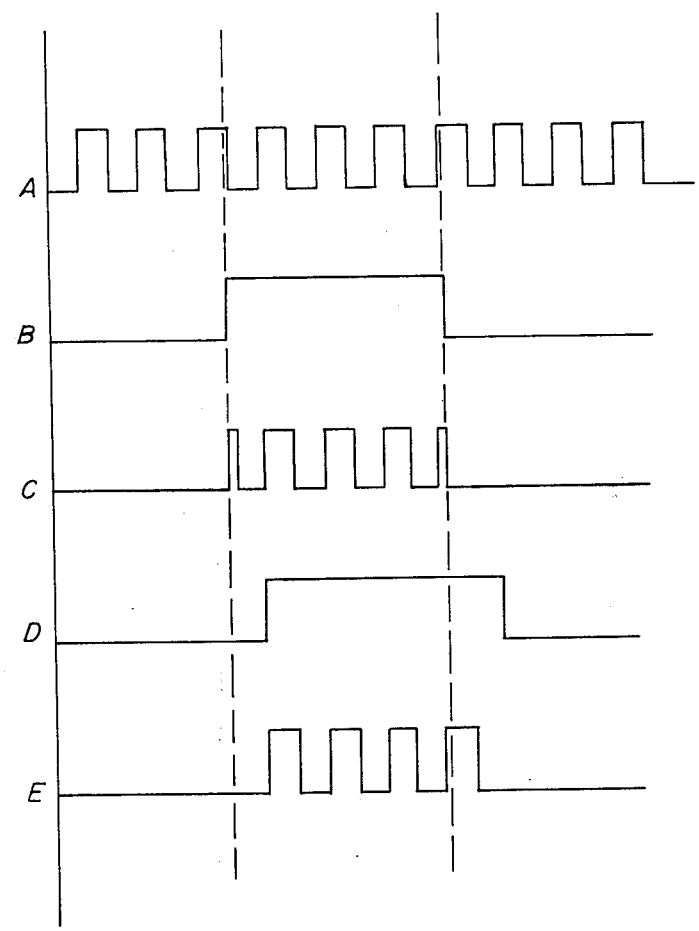

FIG. 4 is an integrator timing diagram illustrating graphical coordination of the signal output of the voltage-to-frequency converter and monostable multivibrator together with the possible development of false pulses and delay of the pulse window of the monostable multivibrator so as to eliminate the false pulses.

Figure 5:
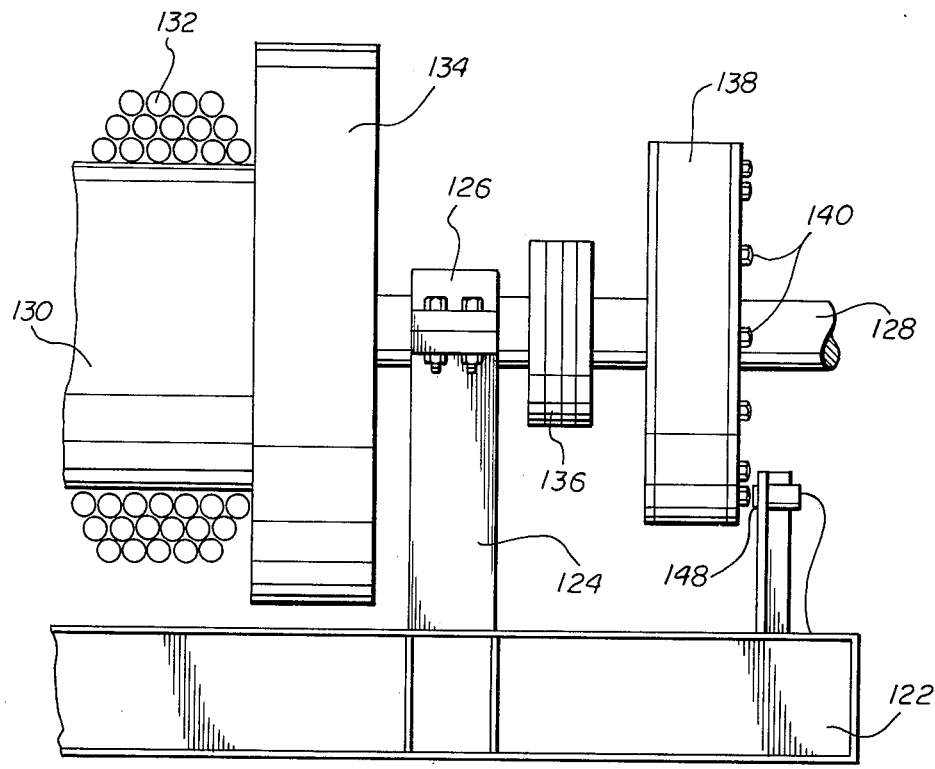

FIG. 5 is a front view of a drawworks system showing a bolt circle and showing a proximity pickup supported in position to detect passage of the individual bolts as the drawworks drum is rotated.

Figure 6:
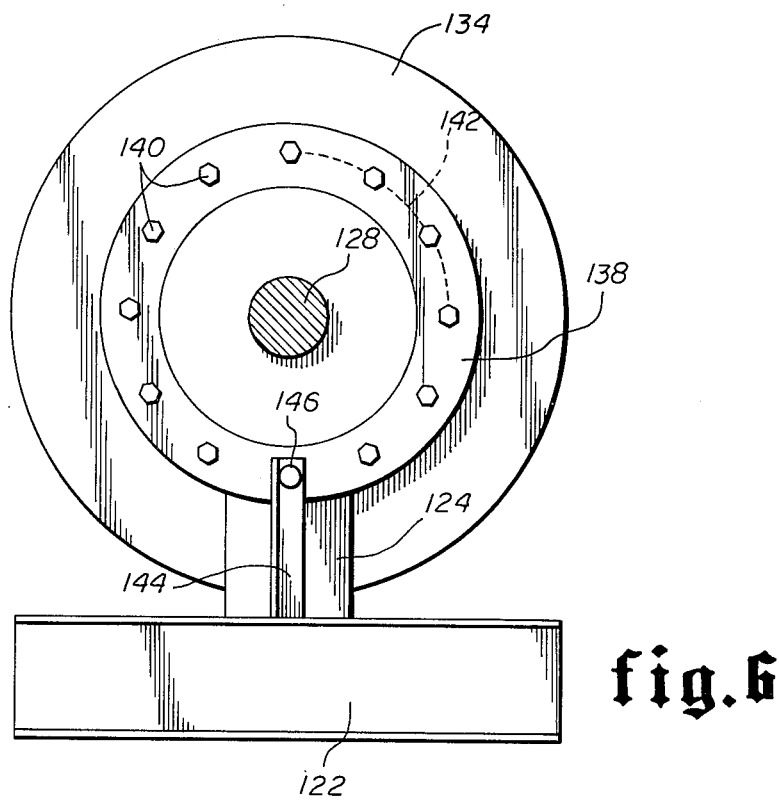

FIG. 6 is a side view of the drawworks system of FIG. 5.

DETAILED DESCRIPTION OF PREFERRED EMBODIMENT

Referring now to the drawings and first to FIG. 1, there is illustrated a drawworks and block and tackle system generally at 10 such as typically employed during drilling and service operations for oil wells. The drawworks system includes a drawworks drum 12 having a length of wire rope or cable 14 spooled thereon. The block and tackle system typically incorporates a crown block generally illustrated at 16 that is mounted at the upper portion of a well drilling derrick and further incorporates a traveling block illustrated generally at 18 that is moved vertically relative to the stationary crown block by means of the cable or line. At one side of the crown block is typically provided a fast line sheave 18 and at the opposite side of the crown block is provided a dead line sheave 20. Intermediate sheaves 22 are employed to accommodate the number of lines that are utilized in the block and tackle lifting system. The traveling block 18 is provided with a plurality of traveling block sheaves 24, the number of which also corresponds to the maximum number of lines that are expected to extend between the crown block and traveling block. The traveling block is also provided with a hook 26 that supports the drill string, well casing or other load being supported by the block and tackle system.

The length of cable extending between the drawworks drum 12 and the fast line sheave 18 is referred to as the fast line which is illustrated in FIG. 1 at 28 and a dead line 30 extends between the dead line sheave 20 and a dead line anchor 32 with the remote extremity 34 extending to a storage reel 36 where fresh cable is stored for future use. As indicated above, it is customary to begin drilling operations with eight lines passing between the crown and traveling blocks to provide an eight to one mechanical advantage. As greater supporting capability is required by deeper drilling of the well bore causing substantial increase in the weight of the dril string and casing, ten or twelve lines may be strung between the crown and traveling blocks for the purpose of increasing the mechanical advantage such as from eight-to-one to ten-to-one or twelve-to-one. As the number of lines is increased between the two blocks, the mechanical advantage increases but the speed of the traveling block decreases.

Because presently known ton-mile recorder systems are not capable of functioning accurately at high velocity cable movement such as 4,000 feet per minute at the fast line, cable movement is typically detected at the slow line sheave 21 of the crown block. By detecting cable movement at the slow line sheave and by introducing a multiplier factor, depending upon the number of lines extending between the crown block and traveling block, ton-mile recorder capability can be accomplished and an accumulated ton-mile display may be provided for inspection by operating personnel. Multiplication of slow line incremental movement, however, is not entirely satisfactory since the resulting total of the calculations is inaccurate due to multiplication of any error that might exist. A further possibility of manual error also exists due to the fact that a manual selection must be made to select the cable multiplying factor, depending upon the number of lines extending between the crown block and traveling block. It is possible that manual errors may also be introduced and multiplied. It is desirable to eliminate the possibility of any manual errors and to achieve detection of cable movement in direct response to fast line movement without employing any multiplying factors that might introduce further inaccuracies.

While working stuck pipe to free it within the well bore, cable loads are repeatedly applied through the block and tackle system of the drilling rig but there is usually only minimal movement of the traveling block because of the stuck pipe. Where cable movement is detected at the slow line, the incremental movement of the slow line is usually too small to measure and thus such cable work does not become accumulated by the ton-mile recorder. It is desirable to detect fast line movement in the order of about three inches to about ten inches with a ton-mile recorder system in order that the work of the cable may be accurately presented even when working stuck pipe or otherwise causing small incremental movement of the cable system. In order for the teachings of U.S. Pat. No. 3,884,071 to be employed for detection of fast line movement in the range of about three inches, ome 754 magnets would be necessarily embedded in a slow line sheave of 60" diameter in order to accomplish the appropriate ton-mile calculations. This, of course, is a practical impossibility, and therefore such devices are not capable of measuring incremental fast line movement when such movement is minimal.

In accordance with the present invention, as shown in FIG. 2, the drawworks drum 12 is provided with a shaft 38 typically extending through appropriate bearings. A gear 40 is connected to the shaft 38 and presents a plurality of gear teeth 42 each of which being representative of a small segment of rotational movement of the drawworks drum and is thus representative of a small increment of linear movement of the fast line section 28 of the cable. A Hall-effect or other metal or non-metal proximity detector 44 is positioned so as to locate the sensor 46 thereof in close proximity to the path of the gear teeth 42. As each gear tooth comes into close proximity to the sensor 46, the proximity detector generates an output pulse in conductor 48 which is in turn coupled to signal processing circuitry 50 for appropriate electronic processing of the signal. The pulse signal generated by the proximity detector is a single square wave pulse for each gear tooth, which pulse also represents an increment of movement of the fast line 28. Alternatively, as shown in FIG. 2, the drawworks drum may often have an appended part 41 attached to its shaft 39 being provided with a quantity of bolts 43 arranged to form a circle. In such case, it is often convenient to utilize the bolt 43 to activate the metal proximity detector 45 which provides an output pulse in conductor 49, which is in turn connected to signal processing circuit 50 for appropriate electronic signal processing.

As shown at the lower portion of FIG. 2, a tension/hydraulic transducer is illustrated generally at 52 which comprises a base portion 54 that is secured to the dead line 30 by means of appropriate clamp elements 56 and 58. A plunger element 60 extending through the base portion 54 is moved responsive to tension applied to the dead line 30, thus causing consequent increase or decrease or hydraulic pressure contained within a hydraulic chamber 62. The pressure of the hydraulic fluid is transmitted via a hydraulic line 64 to a pressure/voltage transducer device 66 that is connected by means of a tee fitting 68 into hydraulic line 64 which ordinarily transmits hydraulic pressure to a hydraulic weight indicating system of the drilling rig. Since most modern drilling rigs incorporate hydraulic weight indicator systems of this nature, it is considered inexpensive to simply tap into this hydraulic line and also transmit the hydraulic pressure to the pressure/voltage transducer. In response to the pressure within the hydraulic fluid line 64, the transducer 66 generates an electrical analog signal in a conductor 70 that is also coupled to the signal processing circuitry 50. The analog signal, which is representative of weight or tension applied to the dead end line 30 is a D.C. voltage that is proportional to the weight being supported by the cable.

The electronic signal processing ciruitry 50 is designed particularly to perform the calculation:

$$W = \int_0^\infty T dx$$

Where:
W = ton-miles (work done by the cable)
T = weight applied to the cable
dx = distance of cable movement The display portion of the circuitry 50 includes a digital counter 72 that is capable of being manually reset and a digital counter 74 that is nonresetable and continuously accumulates data indicating work done by the cable. When new cable is installed in the block and tackle system of the drilling rig, a reading is taken of the nonresetable digital counter 74 and the resetable digital counter is reset at "0." In the event the resetable counter should be inadvertently reset, drilling personnel will be able to calculate accumulated work down by the cable by comparing the total of counter 74 with the reading taken at cable installation. Human error is thus eliminated.

Referring now to FIG. 3, the signal processing circuitry 50 is presented more specifically by virtue of the schematic diagram. The circuitry incorporates a distance input 74 that receives the pulse signals from the proximity detector 44 via conductor 48. The pulse input signals are filtered by means of a resistance capacitance network including resistors 76 and 78 and a capacitor 80. The filtered pulse signals are then processed by means of a Schmitt trigger circuit 82 having the capability of shaping the pulse wave form shown at 84 to the square wave form illustrated at 86. The Schmitt trigger circuitry shapes up the incoming pulse and provides a square wave form having a fast rise time as indicated at 86. The Schmitt trigger circuit is coupled by conductor 88 with a monostable multivibrator circuit 90 having a resistance and capacitance network incorporating a variable resistor 92 and a capacitor 94. The resistance-capacitor network of the one-shot provides a time constant that determines the duration or width of the output pulse.

The monostable multivibrator or one-shot 90 is set by means of the variable resistor 92 such that positive going pulse segments applied to the input thereof will trigger it to produce an output pulse of a certain duration, which output pulse is illustrated at 96. The width of the output pulse 96 must be carefully determined such that at maximum cable speed the pulses do not overlap or become contiguous. For example, assuming that one distance pulse reflecting cable movement is desired for each three inches of cable movement and the maximum cable speed is 4,000 feet per minute, then:

$$\lambda = \frac{60 \text{ sec/min}}{(4,000 \text{ ft/min})(4 \text{ pulses/ft})}$$

$\lambda = 0.00375$ sec/pulse $\lambda = 3.75$ mS

The one-shot circuit is therefore adjusted to produce 3.75 mS pulses by means of the resistant capacitance network 92–94.

The cable weight analog signal which is identified graphically at 98 is introduced at the input 100 of a voltage-to-frequency converter 102 after suitable filtering by a resistance and capacitance network including a resistor 104 and capacitor 106. The voltage-to-frequency converter circuit 102 is provided with a time constant by a resistance capacitance network including a variable resistor 108 and a capacitor 110 and develops a pulse train identified graphically at 112 having a frequency that is proportional to the weight supported by the cable of the drilling rig. The output conductor 114 of the voltage-to-frequency converter 102 is coupled by means of conductor 116 to a "D" type flip-flop circuit 118.

The basic integration (multiplication) of weight takes place as follows: For each incremental distance of cable travel, a pulse is created of predetermined and constant width and is applied to an AND gate 120. Likewise applied to the AND gate is the pulse train created by the voltage-to-frequency converter to represent weight applied to the cable system. For the sake of example, let the weight of the empty traveling block (15 tons) produce a frequency of 1066.67 Hz. For each gate pulse of 0.00375 seconds, four cycles are allowed to pass through the AND gate. The divider is arranged to divide by:

$$D = \frac{(5280 \text{ ft/mi})(4 \text{ gates/ft})(4 \text{ cycles/gates})(12 \text{ lines})}{15 \text{ tons}}$$

D=67,548 cycles/ton-mile

Thus, the counters are updated by one ton-mile for each 67,584 cycles from the integrator circuitry. It may be easily demonstrated that the constant is valid for any number of lines strung, since the weight (line tension) increases in direct proportion to the reduction in distance when less lines are strung.

Unfortunately, the ideal situation described above does not exist in fact. With reference to the timing diagrams of FIG. 4, it will become evident that at low ratios of weight pulse frequency to gate pulse width, large errors can be developed by the multiplier circuitry due to the effect of false pulses. The output of the voltage-to-frequency converter is illustrated at A while the pulse output of the single shot is shown at B. In view of the fact that the single shot output pulse is not synchronized with the output of the voltage-to-frequency converter the result of A–B And operation may develop false pulses as shown at C. Even though the gate pulse B is only wide enough to admit four pulses, the fact that it is not synchronized with the weight pulses A causes five pulses to appear. The "D" type flip-flop circuit 118 functions to synchronize the gate pulse window with the weight frequency pulse as follows:

The gate pulse is applied to the "D" or data input of the flip-flop circuit 118 and thus the flip-flop circuit is armed to transfer the gate pulse to the "Q" output of the flip-flop circuit at the next positive edge of the weight pulse A that is applied to the "clock" input of the flip-flop circuit. Thus, the gate pulse is delayed to correspond exactly with the beginning of the next weight pulse. Likewise, the gate pulse is stopped in the same manner. The effect achieved by the flip-flop circuit 118 delays or shifts the window established by the gate pulse as shown in comparison of the timing diagrams B and D of FIG. 4. In comparing timing diagrams D and E of FIG. 4, the resulting delay of the gate pulse and correspondence between the gate pulse and the voltage-to-frequency converter becomes clearly evident. The possibility of false pulses is eliminated and thus the accuracy of the multiplier system is increased from 25% (at a four-to-one pulse ratio) to 1%.

It is highly desirable in the manufacture and sale of ton-mile recorder systems to provide equipment that may be efficiently integrated with existing equipment typically found on conventional drawworks systems. Accordingly, as illustrated in FIGS. 5 and 6, there is provided a proximity pickup system for detecting drawworks drum movement, which pickup system is responsive to passage of the bolts of a drum clutch bolt circle of conventional nature and which is present on most drilling rig drawworks systems. As shown in FIGS. 5 and 6, the drawworks system incorporates a skid or base structure 122 having a bearing support structure 124 interconnected therewith and extending upwardly therefrom. A shaft bearing structure 126 is provided at the upper portion of the bearing support 124 and provides rotatable bearing support for the shaft 128 of a wire line drum 130 about which wire line 132 is wound. The drum structure 130 incorporates a drum flange 134 that retains the wire line in proper position on the drum. A drive sprocket 136 is typically interconnected in nonrotatable relation with the drum shaft 128 and a drive chain system interconnects the drive sprocket with a source of motive power that induces rotation to the drum shaft and drum.

The drawworks system also typically includes a drive clutch structure 138 that is interconnected with the drum shaft 128 and presents a plurality of boltheads 140 which are evenly spaced about the drive clutch and define a bolt circle, a part of which is shown in broken line at 142. Although the spacing of the various bolts 140 of the bolt circle 142 will vary to some degree, it has been determined that the spacing of the evenly spaced bolts of typical drilling rig drawworks systems represents approximately ten inches of line travel. Although the spacing of the bolts is substantially greater as compared to the spacing of the gear teeth described above, typical bolt spacing nevertheless represents quite accurate measurement of line travel. Furthermore, since the spacing of the bolts represents line travel which is directly measured without any requirement for conversion of measurement signals to represent fast line movement. Under circumstances where greater accuracy is required, however, the gear tooth detection technique described above may be employed within the spirit and scope of the present invention. It is also within the spirit and scope of this invention to achieve incremental drum movement detection by any other suitable means that enables the detection of suitably small increments of drum movement.

In accordance with the embodiment illustrated in FIGS. 5 and 6, a support post 144 may be interconnected with the drawworks skid 122 and a suitable proximity device 146 will be attached to the upper portion of the post 144 and position with the proximity detector portion 148 thereof in accurate registry with the bolt circle 142. As the various bolts 140 are individually moved into selected proximity with the proximity detector 146, an electrical signal is generated that represents an increment of fast line movement.

In order to install the fast line movement detection apparatus, the only modification that is required to the drawworks system is the attachment of the support post 144 to the drawworks skid 122. This may be accomplished by welding, bolting or by any other suitable form of attachment. Installation is therefore possible with minimal requirement for modification and without in any way interfering with operation of the drawworks system.

Having thus described the invention, it will be apparent to those skilled in the art that various changes and modifications can be made without departure from the spirit of the invention or the scope of the appended claims.

What is claimed is:

1. A method of calculating accumulation of work done by the cable of a drawworks system or the like, said method comprising:
   detecting incremental rotational movement of the drawworks drum of said drawworks system, there being a plurality of rotational increments for each revolution of said drawworks drum and providing a first electrical signal for each increment of drawworks rotational movement detected;
   detecting the weight being supported by the cable said drawworks system during each increment of rotational movement of said drawworks drum, and providing a second electrical signal representative of the weight detected;
   electronically integrating said first and second electrical signals and providing an integrated electrical output signal representative of weight applied to said cable and distance of cable movement and indicating work done by said cable during each of said increments of rotational movement of said drawworks drum:

means being rotatable along with said drawworks drum and incorporating a circle of evenly spaced bolts the spacing of which is representative of increments of rotational movement of said rotatable means; and
   a proximity detector is positioned in fixed relation and oriented in close proximity to said circle of bolts, said proximity detector generating an output pulse responsive to passage of each bolt thereby as said means is rotated, said output pulse being said first electrical signal.

2. A method of calculating accumulation of work done by the cable of a drawworks system or the like, said method comprising:
   detecting incremental rotational movement of the drawworks drum of said drawworks system, there being a plurality of rotational increments for each revolution of said drawworks drum and providing a first electrical signal for each increment of drawworks rotational movement detected;
   detecting the weight being supported by the cable said drawworks system during each increment of rotational movement of said drawworks drum, and providing a second electrical signal representative of the weight detected;
   electrically integrating said first and second electrical signals and providing an integrated electrical output signal representative of weight applied to said cable and distance of cable movement and indicating work done by said cable during each of said increments of rotational movement of said drawworks drum, said first electrical signal being a pulse signal and said second electrical being an analog signal;:
   processing said first electrical signal to develop a square wave shaped signal;
   further processing said square wave shaped signal to develop a gate pulse window of predetermined duration;
   processing said analog signal to develop a pulse train having a frequency proportional to the weight detected;
   processing said gate pulse window and said pulse train to synchronize said gate pulse window with the frequency of said pulse train;
   applying said gate pulse window and said pulse train to an AND gate to provide AND gate output pulses reflecting integration of said first and second electrical signals; and
   accumulating said AND gate output pulses to reflect work done, by said wire rope.

3. The method of claim 2, wherein said method includes:
   dividing said AND gate output pulses and developing AND gate divided output signals; and
   introducing said AND gate divided output signals to a signal counting device.

4. A method of calculating accumulation of work done by the cable of a drawworks system or the like, said method comprising:
   detecting incremental rotational movement of the drawworks drum of said drawworks system, there being a plurality of rotational increments for each revolution of said drawworks drum and providing a first electrical signal in the form of a pulse signal for each increment of drawworks rotational movement detected;

detecting the weight being supported by the cable said drawworks system during each increment of rotational movement of said drawworks drum, and providing a second electrical signal in the form of an analog signal representative of the weight detected;

electronically integrating said first and second electrical signals and providing an integrated electrical output signal representative of weight applied to said cable and distance of cable movement and indicating work done by said cable during each of said increments of rotational movement of said drawworks drum;

processing of said first electrical signal by means of a Schmitt trigger circuit to develop a shaped signal;

processing of said shaped signal by means of a monostable multivibrator to develop a gate pulse window of predetermined duration;

processing of said analog signal by means of voltage to frequency converter to produce a pulse train having a frequency proportional to the weight detected;

processing said output pulse of said monostable multivibrator and said pulse train by means of a "D" type flip-flop circuit to synchronize said gate pulse window with the frequency of said pulse train;

applying said synchronized gate pulse window and said pulse train to an AND gate to develop AND gate output pulses; and accumulating said AND gate output pulses to reflect work down by said wire rope.

5. The method of claim 4, wherein said method includes:

dividing said AND gate output pulses and developing AND gate divided output signals; and introducing said AND gate divided output signals to a signal counting device.

6. The method of claim 3, wherein:

said first electrical signal is developed by a metal proximity detector functioning in conjunction with a multitoothed device rotated along with said drawworks drum.

7. The method of claim 3, wherein:

said method step of integrating said first and second electrical signals is accomplished by performing the calculation:

$$W = \int_0^\infty T dx$$

where:
W = Ton-miles (work)
T = Weight applied to cable
dx = Distance of cable movement 8. An electronic circuit for automatically and continuously calculating the work done by the wire rope of a drawworks system and providing a display representing an accumulated total of such work, said circuit comprising:

a multi-toothed rotary element being rotated by the drawworks drum shaft of said drawworks system, said multi-toothed rotary element having teeth at least partially composed of metal, the spacing of the teeth of said rotary element defining increments of fastline movement;

a metal proximity detector circuit including a detector element positioned so as to detect the passage of each tooth of said multi-toothed rotary element during rotation of said drawworks drum and said multi-toothed rotary element, said metal detector circuit generating an output pulse signal representing incremental rotational movement of the drawworks drum of the drawworks system, there being a plurality of rotational increments in each revolution of said drawworks drum;

means for generating an electrical analog signal reflecting the weight applied to said wire rope during each increment of rotational movement of said drawworks drum;

means for integrating said pulse and analog signals and developing an integrated output signal representative of work done by said wire rope; and means for accumulating said integrated output signals and reflecting an accumulated total of work done by said wire rope.

9. An electronic circuit for automatically and continuously calculating the work done by the wire rope of a drawworks system and providing a display representing an accumulated total of such work, said circuit comprising:

means defining an evenly spaced circle of bolts and being rotated along with said drawworks drum, the spacing of said bolts defining increments of fastline movement;

a proximity detector being supported in fixed relation and being so oriented with respect to said circle of bolts as to detect passage of each bolt thereby, said proximity detector generating an output pulse signal responsive to passage of each bolt thereby representing incremental rotational movement of the drawworks drum of the drawworks system, there being a plurality of rotational increments in each revolution of said drawworks drum;

means for generating an electrical analog signal reflecting the weight applied to said wire rope during each increment of rotational movement of said drawworks drum;

means for integrating said pulse and analog signals and developing an integrated output signal representative of work done by said wire rope; and means for accumulating said integrated output signals and reflecting an accumulated total of work done by said wire rope.

10. An electronic circuit as recited in claim 9 wherein:

a Schmitt trigger circuit is provided; and said pulse signals are applied to said Schmitt trigger circuit resulting in a Schmitt trigger circuit output of shaped pulses to provide fast rise time.

11. An electronic circuit as recited in claim 10, wherein:

a monostable multivibrator is provided having the input thereof coupled to the output of said Schmitt trigger circuit, said monostable multivibrator being responsive to positive going pulse segments at the input thereof to develop an output pulse of a predetermined duration.

12. An electronic circuit as recited in claim 11, wherein:

said predetermined duration of said output pulse of said monostable multivibrator being such that, at the maximum pulse frequency expected from said metal proximity detector, each of said pulses remains unitary.

13. An electronic circuit for automatically and continuously calculating the work done by the wire rope of a drawworks system and providing a display representing an accumulated total of such work, said circuit comprising:
- means for generating electrical pulse signals representing incremental rotational movement of the drawworks drum of the drawworks system, there being a plurality of rotational increments in each revolution of said drawworks drum;
- circuit means coupled to said means for generating said first electrical signal and developing a gate pulse of a predetermined duration;
- means for generating electrical analog signals reflecting the weight applied to said wire rope during each increment of rotational movement of said drawworks drum;
- circuit means coupled to said means for generating said electrical analog signals and developing a pulse train having a frequency proportional to the weight applied to said cable;
- means for integrating said pulse and analog signals and developing integrated output signal means representative of work done by said wire rope, said integrating means including circuit means receiving said gate pulse and said pulse train and synchronizing the window of said gate pulse with the frequency of said pulse train;
- an AND gate receiving said synchronized gate pulse and said pulse train and having an AND gate output representing integration of said first and second electrical signals; and
- means for accumulating said integrated output signal means and reflecting an accumulated total of work done by said wire rope.

14. An electronic circuit as recited in claim 13, wherein said circuit includes:
- a divider circuit coupled to the output of said AND gate; and
- a counting circuit receiving the output of said divider circuit and providing an accumulated display of divided signals representing work done by said cable.

15. An electronic circuit as recited in claim 13, wherein:
said means for integrating said pulse and analog signals performs the calculation:

$$W = \int_0^\infty T dx$$

where:
W = Ton-miles (work)
T = Weight applied to cable
dx = Distance of cable movement

* * * * *